Nov. 4, 1958  E. C. CONNELLY  2,859,313
HERMETIC SEAL FOR ELECTRICAL SWITCHES
Filed Dec. 14, 1956  3 Sheets-Sheet 1
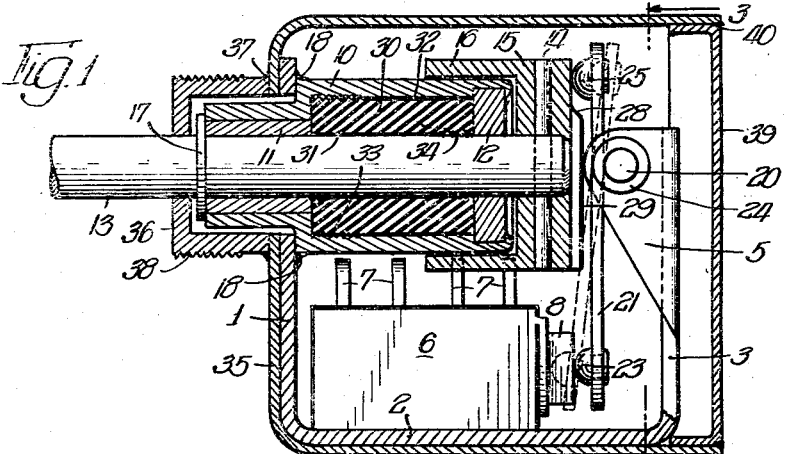
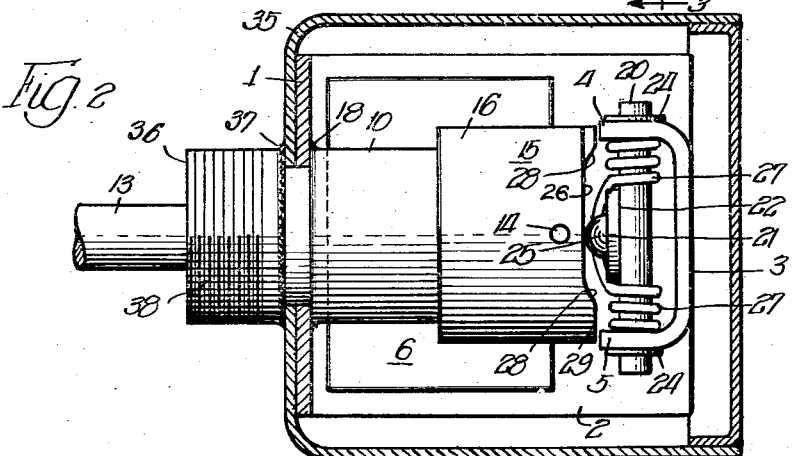
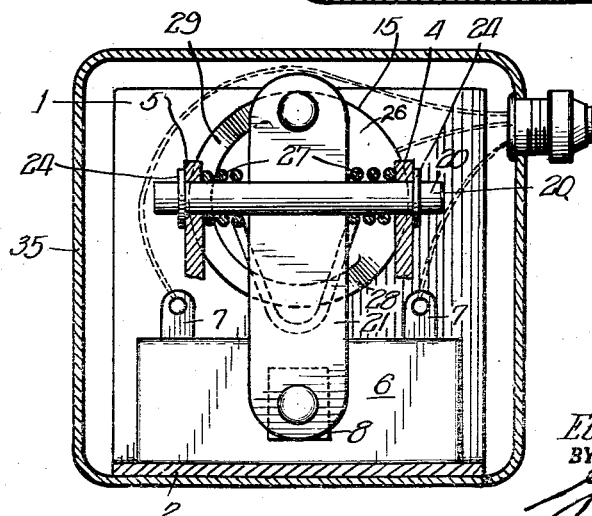
INVENTOR.
Eugene C. Connelly,
BY George H. Simmons
Atty.

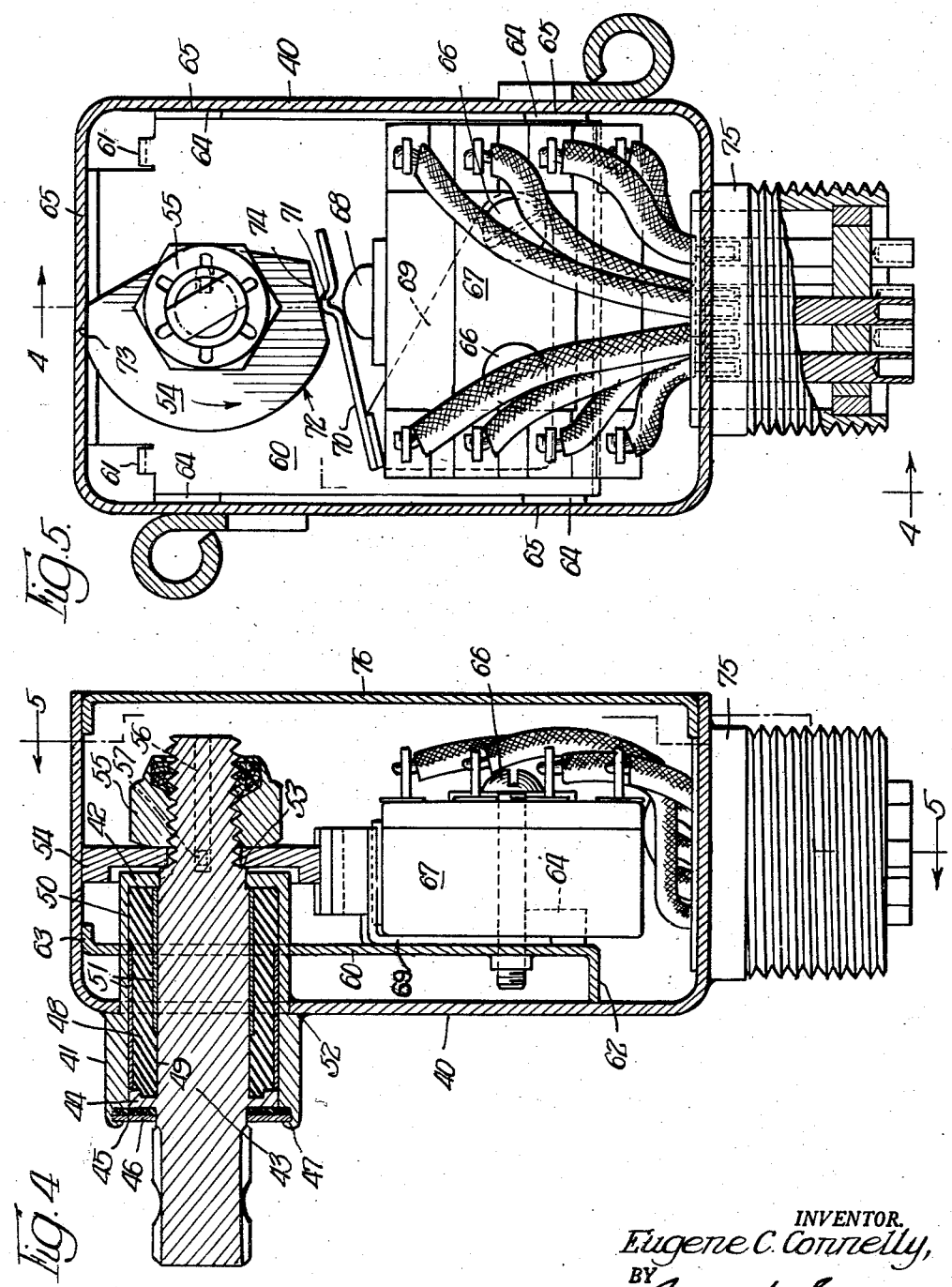

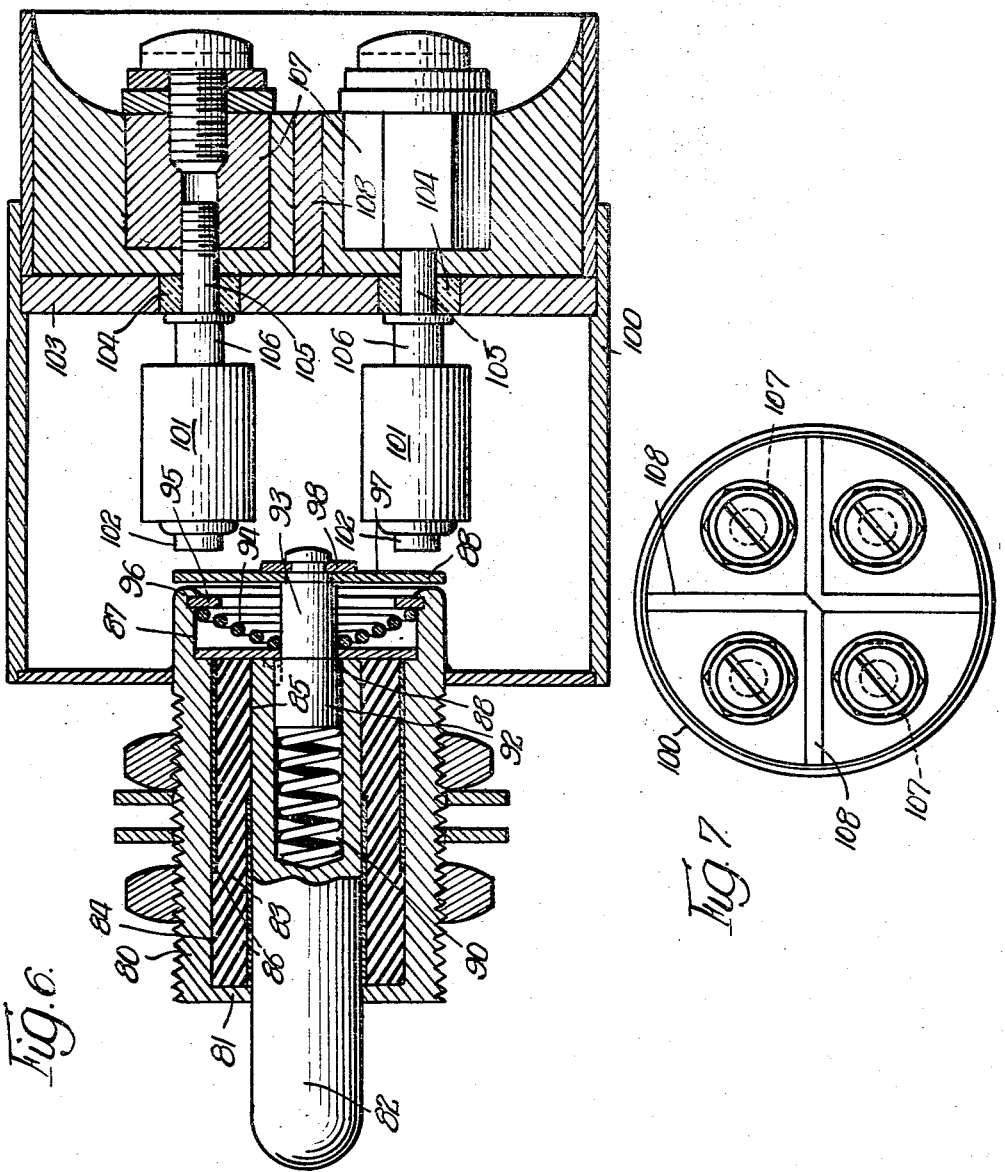

United States Patent Office 2,859,313
Patented Nov. 4, 1958

2,859,313

HERMETIC SEAL FOR ELECTRICAL SWITCHES

Eugene C. Connelly, Chicago, Ill., assignor to Electro-Snap Switch & Mfg. Co., Chicago, Ill., a corporation of Illinois Application December 14, 1956, Serial No. 630,432

10 Claims. (Cl. 200—168)

This invention relates to a hermetic seal for an electrical switch that has an operating plunger depressible into the switch casing to operate the switch, and has for its principal object the provision of a new and improved seal of this kind.

It is a main object of the invention to provide a hermetically sealed casing enclosing an electric switch, and to provide a hermetic seal for a shaft that projects out of the casing and is moved to operate the switch.

Another object of the invention is to provide a hermetic seal for a rotatable shaft, which seal is stressed in torque as the shaft is rotated in oscillatory movement and maintains seal with the shaft throughout such rotation.

Another object of the invention is to provide a hermetic seal for a shaft that is moved longitudinally to operate an electric switch disposed in a hermetically sealed casing.

Another object of the invention is to provide a hermetic seal for a shaft that is rotatable in oscillatory movement or is moved longitudinally to operate an electric switch, which seal is capable of remaining effective through a wide range of temperature changes.

Another object of the invention is to provide a hermetic seal for a shaft, which can be manufactured at low cost without sacrificing quality and which requires a minimum of maintenance to keep it in proper operating condition.

Further objects of the invention not specifically mentioned here will be apparent from the detailed description and claims which follow, reference being had to the accompanying drawings in which a preferred embodiment of the invention is shown by way of example and in which:

Fig. 1 is an elevational view, partly in section, showing the invention;

Fig. 2 is a plan view of the invention with the casing shown in section;

Fig. 3 is an end view taken substantially along the line 3—3 of Fig. 1, looking in the direction of the arrows;

Fig. 4 is a cross sectional view of another embodiment of the invention taken along the line 4—4 of Fig. 5, looking in the direction of the arrows;

Fig. 5 is a rear elevational view of the embodiment shown in Fig. 4, with the casing in section along the line 5—5 of Fig. 4, looking in the direction of the arrows;

Fig. 6 is a side view in cross section of the seal applied to a push button operated switch; and Fig. 7 is a rear elevational view of the switch shown in Fig. 6.

This application is a continuation-in-part of my prior application Serial No. 558,675, filed January 12, 1956.

The electric switches are commonly employed to control circuits in aircraft and the like, and to insure proper operation of these switches under the widely varying conditions of atmospheric pressure and temperature to which such craft are subjected it is oftentimes necessary to encase the switch in a hermetically sealed casing from which projects a shaft by which the switch mechanism is operated. Switches of the so-called snap action type are commonly employed in such uses, such switches comprising a casing in which the switch mechanism is housed and from which casing an operating plunger or button projects, this button being telescoped into the casing to bring about an operation of the switch mechanism. In some installations of the kind above referred to, rotation or oscillation of the operating shaft operates the switch mechanism, and in other installations axial movement of the shaft operates the switch mechanism.

The present invention provides, as its principal object, a hermetic seal for the operating shaft of an electric switch, which shaft projects through a hermetically sealed casing in which the switch is housed. The seal of the present invention permits the shaft to be rotated through a wide arc or to be moved axially thereby to operate the switch. Mechanism carried by the operating shaft imparts but calculated movement to the operating plunger of the switch regardless of the amount of movement of the operating shaft.

Referring now to the drawings in more detail, from Figs. 1 to 3, inclusive, it will be seen that in one embodiment of the invention the device consists of a bracket having a front arm 1, a bottom arm 2, and a rear arm 3, which rear arm contains spaced apart forwardly extending ears 4 and 5. Mounted upon the base arm 2 of this bracket is a switch mechanism 6, the particular details of which form no part of the present invention. It is sufficient to say that the switch mechanism 6 consists of a housing formed of an insulating material and from which two or more terminals 7 project. An operating plunger 8 also projects from the housing and is telescoped into that housing to effect an operation of the switch.

Fixed upon the front arm 1 of the bracket is a cylindrical bushing 10 that projects through an opening in the bracket and extends therebeyond. Fixed in the bushing 10 are bearing members 11 and 12 which serve as journals to support a shaft 13 in the bushing. Fixed upon the inner end of the shaft 13 in suitable manner, as by a pin 14, is a cam 15 which, it will be noted, is generally cup shape and has a forwardly extending portion 16 that journals upon the outer surface of the bushing 10. A suitable washer 17 bears against the forward bushing member 11 and with the cam 15 serves to position the shaft 13 axially in the bushing.

The bushing 10 is fixed in the arm 1 of the bracket by suitable means such as welds 18 which form a hermetic seal.

Journaled in the forwardly extending portions 4 and 5 of the rear arm 3 of the bracket is a shaft 20 upon which an operating lever 21 is fixed in convenient manner as by welds 22. Operating lever 21 carries at its lower end a button 23 which bears against the operating plunger 8 of the switch. Washers 24 on the shaft 20 position it axially in the bracket arms 4 and 5, thereby to maintain the button 23 in proper registration with the plunger 8.

At its upper end, operating lever 21 carries a button 25 that bears against the cam 15. When the button 25 is in engagement with the valley portion 26 of the cam 15, operating lever 21 is positioned as shown in full lines in Fig. 1, there being a spring 27 wound around the shaft 20 and engaging the operating arm 21 to urge it counterclockwise, as seen in Fig. 1, thereby to maintain the operating button 25 in operating relation to the cam.

Located at the ends of the valley 26 of the cam are inclined surfaces 28 that merge into the dwells 29 of the cam and as the shaft is rotated operating button 25 rides over the inclined surfaces 28 into engagement with the dwell 29, thereby rotating the operating lever 21 clockwise, as seen in Fig. 1, into the dotted line position shown in this figure, which operation forces plunger 8 into the switch casing 6, thereby to effect an operation of the switch mechanism.

Fitted within the bushing 10 and around the shaft is a sleeve 30 composed of a resilient material. Also surrounding the shaft 13 is a liner 31 that extends from the inner end of the bushing 11 into juxtaposition to the bushing 12, the sleeve 31 being spaced from the bushing 12 as shown. Also within the bushing 10 is a liner 32 that extends forwardly from the bushing 12 and terminates in juxtaposition to the bushing 11, but is spaced therefrom. The liners 31 and 32 are composed of material to which the material in the sleeve 30 will not bond during vulcanization. In one instance, where wide temperature variations are required, sleeve 30 has been formed of silicone rubber and the liners 31 and 32 of polytetrafluoroethylene, commercially known as "Teflon," to which silicone will not bond. There are a number of other materials to which silicone rubber will not bond and their use instead of Teflon is contemplated. During curing of the silicone rubber in sleeve 30, that rubber bonds to the bushing 10 in the band between the end of liner 32 and the end of the bushing, as indicated at 33, and also bonds to the shaft in the band 34 adjacent the bushing 12.

The particular arrangement of bonds 33 and 34 shown are by way of example only as it is obvious that these may be reversed as to in and out position on shaft 13 within the teachings of the invention. Such reversal can be accomplished by positioning liner 31 against bushing 12 and liner 32 against the outer end of the cavity in bushing 10.

The assembly thus formed is inserted in a casing 35 preferably composed of steel and having a perforation in one wall thereof through which the bushing 10 and shaft 13 projects. A cap 36 is fitted over the shaft and projecting end of the bushing and welded to the outside of the casing 35 by welds 37 to secure the bracket and parts carried thereby in the casing. Cap 36 may be threaded on its outer surface, as indicated at 38, to facilitate mounting of the switch assembly. A cover 39 closes the rear end of the casing 35 and is secured therein by welds 40 which hermetically close the casing.

In Fig. 3, I have shown one side wall of the casing 35 to be equipped with a bushing 41, which bushing may conveniently be of the type shown in Roeser Patent 2,684,401, issued July 20, 1954, this bushing facilitating entrance of electric wires into the hermetically sealed casing. The particular type of bushing employed and its location in the casing is not of the essence of the present invention.

In operation, shaft 13 is rotated by suitable means, not shown, thereby to move the cam 15 so that the operating button 25 rides over the inclined surface 28 thereon into engagement with the dwell 29 of the cam to effect an operation of the switch. It will be observed that the amount of rotation of the operating lever 21 is governed by the distance between the planes of the dwell and valley of the cam, and not by the degrees of the arc through which the shaft 13 may be rotated.

During rotation of the shaft, the resilient sleeve 30 is stressed in torque and maintains seal with the shaft and bushing even though the shaft be rotated through arcs of great magnitude. When the sleeve 30 is composed of a material, such as silicone rubber which maintains its resilient characteristics over wide variations in temperature, effective seal is maintained throughout those temperatures. Upon release of the forces rotating the shaft 13 and rotation of that shaft in an opposite direction, operating button 25 moves from the dwell to the valley of the cam and operating lever 21 is rotated in a reverse direction to restore the switch to normal.

In Figs. 4 and 5, there is shown an embodiment of the invention in which the switch mechanism is housed in a casing 40 through one wall of which the bushing 41 projects, this bushing having a radial wall 42 at its inner end which serves as a journal for a shaft 43. The shaft has an outwardly extending flangelike wall 44 that journals in the bushing 41 near its outer end. An insulating washer 45 is held against the wall 44 of the shaft by a clamping washer 46 which is secured in the end of the bushing by a rolled-over or staked end 47 thereof.

Within the bushing and around the shaft is a sleeve of elastomer 48 that is bonded to the shaft along a band 49 at one end of the sleeve and is bonded to the bushing along a band 50 at the other end thereof. Liners 51, composed of material to which the elastomer in the sleeve 48 will not bond, are provided as before. Bushing 41 is secured in the casing by welds 52 which form a hermetic seal.

Fixed upon the shaft 43 and abutting against a shoulder 53 thereon is a cam 54 that is held thereon by a nut 55 threaded upon the shaft. If desired, the shaft may be provided with a keyway 56 into which a key 57 mounted upon the cam 54 projects to prevent rotation of the cam with respect to the shaft.

Cam 54 is one having valleys and dwells spaced different distances radially of the axis of the shaft 43 rather than axially thereof as in cam 15 of Fig. 1.

Fitted within the casing 40 is a mounting plate 60 having forwardly extending ears 61 at its upper end and a forwardly extending flange 62 at its lower end, which ears and flange abut against the front wall of the casing to position the mounting plate therein. At the upper end of the plate 60 is a rearwardly extending flange 63 and at the sides thereof are rearwardly extending ears 64, which flange and ears may be spot-welded to the walls of the casing, as indicated at 65, to secure the mounting plate therein.

Mounted upon the mounting plate 60 as by screws 66 is a switch mechanism 67 the details of which form no part of the instant invention. As shown, the switch mechanism 67 consists of a double pole double throw snap action switch, from the housing of which eight terminals project and also an operating plunger 68 by which the switch is operated. Other switch mechanisms may be substituted for the one shown by way of example, within the teachings of the invention.

Interposed between the switch mechanism 67 and the mounting plate 60 is a bracket 69 which at its upper end carries a leaf spring 70 that bears against the operating plunger 68 and against the cam 54.

As will be seen in Fig. 5, when the shaft and cam 54 are rotated in the direction of the arrow, ear 71 formed in the spring 70 will come into engagement with the dwell 72 of the cam and spring 70 will be forced downwardly thereby to telescope operating plunger 68 into the switch housing to operate the switch. Spring 70 resists any tendency for the plunger 68 to be moved sideways by the rotation of cam 54.

It will be noted that with the cam in the position shown in Fig. 5, a flattened surface 73 thereon abuts against the wall of the casing 40 to prevent rotation of the cam clockwise, as seen in this figure. After the cam has been rotated in the direction of the arrow through approximately 180°, a similar flattened surface 74 will engage the wall of the casing 40 to prevent further rotation of the cam in that direction. Thus the maximum amount of rotation that the shaft of this embodiment of the invention may make is limited by positive stops.

As shown, the terminals of the switch mechanism 67 are connected to a bushing 75 leading out of the casing, which bushing may be of the type shown in the aforementioned Roeser patent.

A rear wall 76 closes the casing 40 and is welded therein to hermetically seal the casing.

In Figs. 6 and 7 there is shown an embodiment of the invention in which the seal is applied to a push button type of switch. In this embodiment the bushing 80 has a front radial wall 81 which supports the shaft 82 and the bushing is open at its rear end. A sleeve 83 of elastomer is bonded to the bushing along a band 84 at one end and to the shaft along a band 85 at the other end of the sleeve. Liners 86 are provided to prevent bonding of the elastomer to the bushing and shaft as before.

At its rear end, bushing 80 contains a counterbore 87 in which is journaled a washer 88 that abuts against the rear end 89 of the shaft 82. The shaft 82 contains a counterbore 90 in which is located a spring 91 and a head 92 of a plunger 93 that projects through the washer 88 and therebeyond. A return spring 94 encircles the plunger 93 and abuts against the washer 88 and against a washer 95 held in the bushing 80 by the rolled-over or staked edge 96 thereof.

Fixed upon the plunger 93 is an operating bar 97 that is secured thereon in any desired maner as by a snap ring 98.

Within the casing 100, from which the bushing 80 projects, is a switch mechanism which in the example shown consists of a pair of switch units 101, each having an operating plunger 102. The particular type of switch units is not of the essence of the present invention.

Fixed in the casing 100 is a header plate 103 composed of metal and in which glass bushings 104 are fused, and the bushings 104 are fused to contact members 105 to which the terminals 106 of the switches 101 are fixed as by brazing, thereby to mount the switches in the casing. Terminals 107 are mounted upon the contact member 105 in any preferred manner and provide for extending the electrical connections outside of the hermetically sealed casing. As shown, switches 101 have two terminals, and the four terminals thus required are shown in Fig. 7. Suitable insulating baffles 108 are interposed between the terminals and the area surrounding the terminals is preferably filled with a potting compound.

In the operation of the switch shown in Figs. 6 and 7, as the push button 82 is pushed inwardly, sleeve 83 is stretched and washer 88 and plunger 93 are moved rearwardly against the tension of spring 94. Operating bar 97 is thus brought into contact with the operating push buttons 102 of the switches, telescoping those buttons into the casings of the switches thereby to operate the switch.

Should push button 82 be moved inwardly after operating bar 97 has engaged the casings of the switches 101, plunger 93 will be telescoped into the push button 82 against the tension of spring 91, thereby to prevent damage to the switch casings. Upon release of the pressure from the push button 82, spring 94 restores the mechanism to the normal position in which it is shown.

From the foregoing it will be apparent that the seal of the present invention is capable of wide adaptation to switch operation wherein the operating shaft is rotated or oscillated, and also to switches operated by a push button. The seal is maintained over a wide range of operation and the travel imparted to the operating plunger of the switch mechanism is limited to a precalculated amount.

While I have chosen to show my invention by illustrating and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. A hermetic seal for an electrical switch having an operating plunger comprising: a hermetically sealed casing in which the electrical switch is mounted; an operating lever pivotally mounted within said casing and bearing against the operating plunger of the switch; a cylindrical bushing fixed in a wall of said casing and extending inwardly therefrom; a shaft journaled in said bushing and extending out of said casing; a cup shaped cam fixed upon said shaft and journaled upon the outer surface of said bushing; dwells upon said cam extending axially of said shaft; spring means urging said operating lever into operating engagement with said cam; and a hermetic seal for said shaft, comprising a sleeve of resilient material encompassing the shaft within the bushing and bonded to the shaft and to the bushing in spaced apart bands.

2. A hermetic seal for an electrical switch having an operating plunger comprising: a hermetically sealed casing in which the electrical switch is mounted; an operating lever pivotally mounted within said casing and bearing against the operating plunger of the switch; a bushing fixed in a wall of said casing and extending inwardly therefrom; a shaft journaled in said bushing and extending out of said casing; a cam fixed upon the inner end of said shaft; spring means urging said operating lever into operating engagement with said cam; a hermetic seal for said shaft comprising: a sleeve of resilient material encompassing the shaft within the bushing; a liner within said resilient material encircling the shaft and extending from one end of the material into juxtaposition to the other end thereof; a liner within said bushing encircling said resilient material and extending from said other end into juxtaposition to said one end thereof; a bond between said resilient material and shaft at said one end of the material; and a bond between said resilient material and said bushing at said other end of the material.

3. A hermetic seal as specified in claim 2, in which the resilient material is silicone rubber and the shaft and bushing liners are composed of a material to which silicone rubber will not bond.

4. A hermetic seal as specified in claim 3, in which the shaft and bushing liners are composed of polytetrafluoroethylene.

5. A hermetic seal for the operating shaft that projects out of a hermetically sealed casing in which an electric switch mechanism is housed, comprising: a hollow bushing hermetically sealed in the casing; an operating shaft disposed concentrically in said bushing and extending therebeyond; a sleeve of elastomer surrounding said shaft and disposed within said bushing; a chemical bond securing the sleeve to the shaft in a band located at one end of the elastomer; and a second chemical bond securing the sleeve to the bushing in a band at the other end of the elastomer.

6. A hermetic seal as specified in claim 5, in which the electric switch mechanism carries a push button by which the switch is operated and in which the shaft carries a cam by which the push button is actuated as the shaft is rotated.

7. A hermetic seal as specified in claim 5, in which the switch mechanism is push button operated and in which the shaft carries an operating bar by which the switch means is operated as the shaft is moved axially through the bushing.

8. A hermetic seal for a shaft, comprising: a bushing containing a cylindrical cavity of length greater than its diameter; a shaft extending through said bushing and concentrically through said cavity; an elastomer sleeve surrounding said shaft and filling said cavity; a chemical bond securing said sleeve to said shaft in a band at one end of the elastomer; and a chemical bond securing said sleeve to said bushing at the other end of said elastomer.

9. A hermetic seal as specified in claim 8, in which the elastomer is silicone rubber and in which there is a liner on the shaft and a liner in the cavity composed of material to which silicone rubber will not bond, thereby to define the bands in which the silicone rubber bonds to the shaft and bushing during vulcanization.

10. A hermetic seal as specified in claim 8, in which a liner lines the cavity from one end thereof into juxtaposition to the other end thereof, and a liner embraces the shaft from adjacent said other end into juxtaposition to the first said end and in which said liners are composed of a material to which the elastomer will not bond during vulcanization.

References Cited in the file of this patent

UNITED STATES PATENTS

| | | |
|---|---|---|
| 2,460,695 | Hennessy | Feb. 1, 1949 |
| 2,520,288 | Shand et al. | Aug. 24, 1950 |
| 2,547,630 | Evans | Apr. 3, 1951 |